Nov. 7, 1933.   W. B. KLEMPERER   1,934,673
METALLIC JOINT AND METHOD OF FORMING IT
Filed March 11, 1931

Inventor
Wolfgang B. Klemperer
By Bee+Bush
Attorneys

Patented Nov. 7, 1933

1,934,673

UNITED STATES PATENT OFFICE 1,934,673

METALLIC JOINT AND METHOD OF FORMING IT

Wolfgang B. Klemperer, Akron, Ohio, assignor to Goodyear-Zeppelin Corporation, Akron, Ohio, a corporation of Delaware Application March 11, 1931. Serial No. 521,706

8 Claims. (Cl. 219—10)

This invention relates to the assembling and uniting of metallic elements and it has particular relation to the welding of aluminum alloys.

One object of the invention is to provide a welded joint between two or more metallic elements, one of which is composed primarily of aluminum.

Another object of the invention is to provide a welded joint between two metallic alloys composed primarily of aluminum.

Another object of the invention is to provide a method of welding two or more pieces of metallic alloys composed primarily of aluminum.

Another object of the invention is to provide a method of uniting two or more pieces of duralumin by a spot welding process.

Strong, light, aluminum alloys, such as duralumin, which is an alloy comprising approximately 95 per cent aluminum, 4 per cent copper, 0.5 per cent magnesium, and 0.5 per cent manganese, attain their greatest strength after having been cold-worked and subjected to a heat treatment by the so-called aging process. Other strong aluminum alloys are treated in a similar manner and are subject to welding according to this invention. Heretofore, such alloys could not be welded satisfactorily because the welded portions were very brittle, their strength is reduced by welding, and of course they were unreliable. Although it was possible to subject the welded alloys to a second cold working and heat treatment after the first welding process for the purpose of partially regaining the lost strength, such procedure was expensive, time consuming, and could be applied only to a very limited range of simple products of relatively small size.

Light aluminum alloys of relatively great strength, such as duralumin, have peculiar characteristics in that they become soft and remain soft when heated to a certain temperature, but, when heated to the highest permissible temperature they first likewise become soft; then after a short time they will again resume their original strength and hardness. Accordingly, torch welding is not satisfactory without sacrificing strength of portions of the metal which cannot subsequently be subjected to a second cold-working and heat treatment, because after the welding process there is a zone in the vicinity of the weld which remains soft and weak, because the local maximum temperature was that of the annealing point.

Large quantities of material shaped into structural elements are now being utilized, especially in the production of aircraft. After assembling single elements the heat treatment is not practical, and therefore the only practical method of assembling that has been possible was by means of riveting. However, riveting requires a great deal of work and is relatively expensive.

Experiments have been conducted in which spot welding has been employed in an effort to avoid riveting of strong, light, aluminum alloys, but this kind of welding was found to be impractical because the welded portions were brittle and weak. Designers have often resorted to the use of substantially pure aluminum which welds satisfactorily, but this procedure involved the contingent sacrifice of strength.

According to this invention, the disadvantages previously experienced in welding the strong aluminum alloys have been obviated and the practical joining together of pieces inaccessible to riveting tools has been accomplished. In uniting the aluminum alloy or duralumin members, a pure aluminum element is disposed between the alloy element and a joint is produced by electrical resistance spot welding. The joint effected by this method of welding is very strong and as the annealing of the material is practically restricted to a very small zone around the spot, which comprises only a negligible fraction of the seamed area, the material between these zones will retain its original strength.

Another embodiment of the invention involves the plating of one or all of the duralumin or alloy members with aluminum before welding. Such plating may be applied to one or both sides of each member and thus the necessity of providing a separate aluminum element as a binder between the alloys is obviated. This kind of joints can be employed to great advantage in preparing structural elements for incorporation in airships, sheet metal containers for various purposes, or other constructions in which aluminum alloys are desirable.

It is to be understood that the term aluminum alloy as employed in this application is intended to include all alloys wherein the greater percentage of metal is aluminum. Other metal considerably lighter than iron may also be welded according to this invention.

For a better understanding of the invention, reference may now be had to the accompanying drawing forming a part of this specification, of which:

Figure 1:
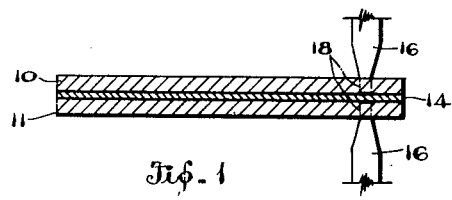
Figure 1 is a cross-sectional view of a pair of duralumin or aluminum alloy elements having an aluminum plate disposed therebetween, and including a fragmentary view of portions of welding electrodes.

Referring to the drawing, a plurality of strong, light, aluminum alloy elements in the form of strips or plates 10, 11 and 12, are shown in various relations with respect to metallic elements in the form of aluminum plates or strips 14 and aluminum coating or plating 15. According to Figure 1, the separate aluminum plate or strip 14 is disposed between the duralumin elements 10 and 11, and two electrodes 16 of a conventional electrical resistance welding apparatus are applied in a conventional manner to weld all of the elements together in zones indicated at 18.

Figure 2:
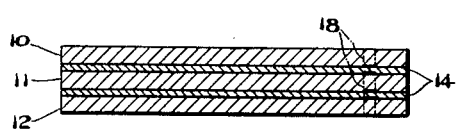
Figure 2 is a cross-sectional view similar to Figure 1, but including an illustration of the manner in which three pieces of duralumin may be welded together.

In the form of the invention disclosed by Figure 2, a single duralumin element 11 is disposed between two aluminum plates 14 upon the outside of which the elements 10 and 12 are applied, and then welded in the same manner as that described with reference to Figure 1.

Figure 4:
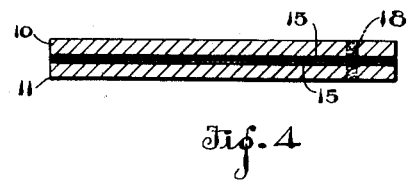
Figure 4 is a cross-sectional view similar to Figure 3, in which two of the duralumin elements are plated with aluminum.
Figure 5:
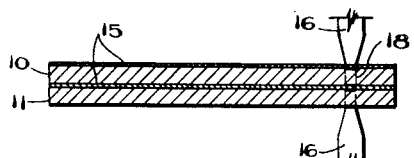
Figure 5 is a cross-sectional view in which one duralumin element is plated on both sides with aluminum.
Figure 3:
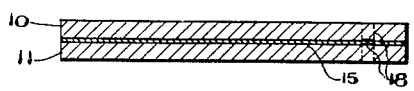
Figure 3 is a cross-sectional view showing a pair of duralumin elements, one of which is coated with aluminum.
Figure 6:
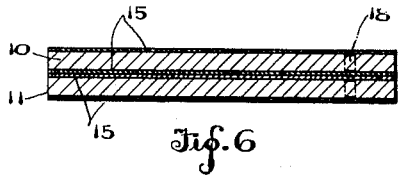
Figure 6 is a cross-sectional view in which two duralumin elements are plated on both sides with aluminum.
Figure 7:
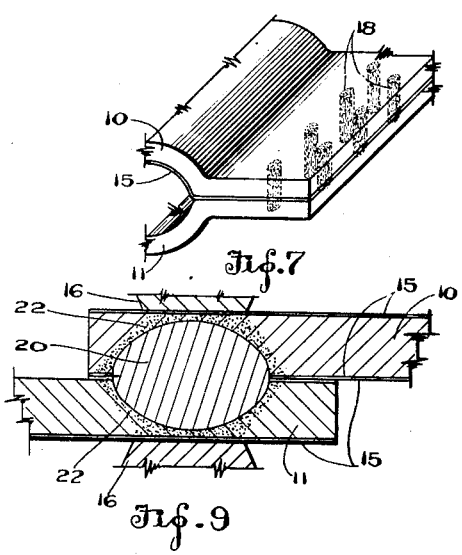
Figure 7 is a fragmentary perspective view of a pair of aluminum elements united by spot welding.
Figure 8:
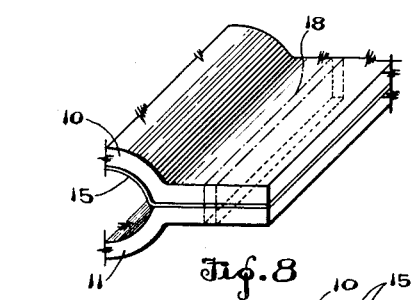
Figure 8 is a fragmentary perspective view of a pair of duralumin elements which are united by continuous seam welding.

According to Figure 3, the duralumin element 10 is provided with a coating or plating 15 of aluminum and the welding operation performed as described above. Likewise, the welding process is performed in the same manner when the aluminum coating or plating 15 is applied to opposing sides of the superposed duralumin elements 10 and 11, as shown by Figure 4, or when the aluminum coating or plating is applied to both sides of one of the duralumin elements, for example, the element 10, as shown by Figure 5. Figure 6 is included for the purpose of disclosing aluminum coating or plating 15 on both sides of each of the duralumin elements 10 and 11. Referring to Figure 7, the series of spot welding zones 18 are shown spaced in staggered relation from the edge portions of the elements 10 and 11. Figure 8 discloses the welding zone 18 as being in a substantially straight continuous seam adjacent the edges of the elements 10 and 11.

Figure 9:
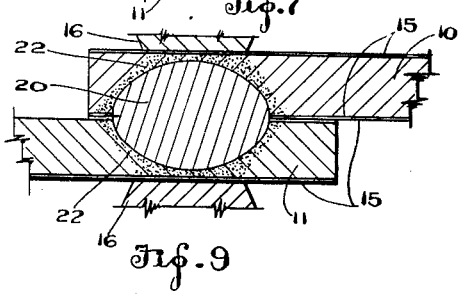
Figure 9 is a diagrammatical fragmentary cross-sectional view of two aluminum plated elements welded together.
Figure 10:
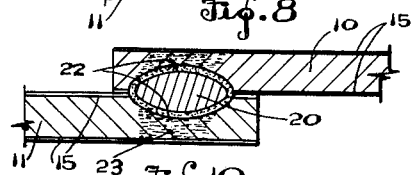
Figure 10 is a diagrammatical fragmentary cross-sectional view of relatively heavy metal welded together.

In Figure 9 the aluminum plated duralumin elements 10 and 11 are shown in an exaggerated form in order to facilitate visualizing the heated and welded portions which include a central inner portion 20 of fused metal and a portion 22 surrounding it of annealed metal. If heavier metal elements are employed, as shown by Figure 10, the fused portion 20 is not so large proportionately and is bordered by the annealed portion 22. Portions 23 surrounding the annealed portions are unaffected, with the exception that they are partially heat treated. The size of the fused portion and also the annealed portion can be minimized by properly governing the electrical energy applied through the electrodes 16.

Since the type of welding described above is satisfactory, it is apparent that the assembling of complicated elements is greatly facilitated and the expense involved is minimized.

Although only the preferred form of the invention have been illustrated and described in detail, it will be apparent to those skilled in the art that the invention is not so limited but that various modifications may be made therein without departing from the spirit of the invention or from the scope of the appended claims.

What I claim is:

1. A method of uniting two or more pieces of duralumin which comprises applying substantially pure non-alloyed aluminum between the pieces and welding the pieces and the pure aluminum together to form a unitary joint.

2. A method of uniting two or more pieces of strong, light aluminum alloy which comprises superposing plates of the alloy and a plate of substantially pure aluminum with the aluminum disposed between the alloy plates, and uniting all of the plates together by a process of electrical resistance welding.

3. A method of uniting two or more pieces of strong light aluminum alloy which comprises coating at least one of the pieces with substantially pure aluminum, and then welding the pieces together.

4. A method of uniting two or more pieces of strong light aluminum alloy which comprises plating the pieces with aluminum, superposing the pieces, and subjecting predetermined zones of the coated pieces to a series of spot welding operations by electrical resistance welding.

5. A method of assembling structural elements composed of aluminum alloy, which comprises superposing portions of the elements, disposing pure aluminum between said elements, and fusing the elements and pure aluminum into a unitary joint by electric spot welding.

6. A method of uniting two or more pieces of aluminum alloy whose physical properties are impaired by fusing, that comprises applying an element of essentially pure non-alloyed aluminum to a portion of said alloy, and directing an electric current through the alloy and element to fuse and weld together a spot of said element and adjacent portions of the alloy pieces.

7. In a metallic construction, a joint comprising duralumin elements having superposed portions, substantially pure aluminum disposed between the elements, and a welded portion wherein the pure aluminum is fused with the duralumin elements.

8. In a metallic construction, a joint comprising superposed elements of strong light aluminum alloy, a coating of substantially pure aluminum disposed upon the superposed surfaces of the elements, said elements having a row of electrically spot welded portions.

WOLFGANG B. KLEMPERER.